Sept. 14, 1965     C. R. McQUILLIN ETAL     3,206,068
FISH HOOK DISPENSER
Filed Oct. 14, 1963
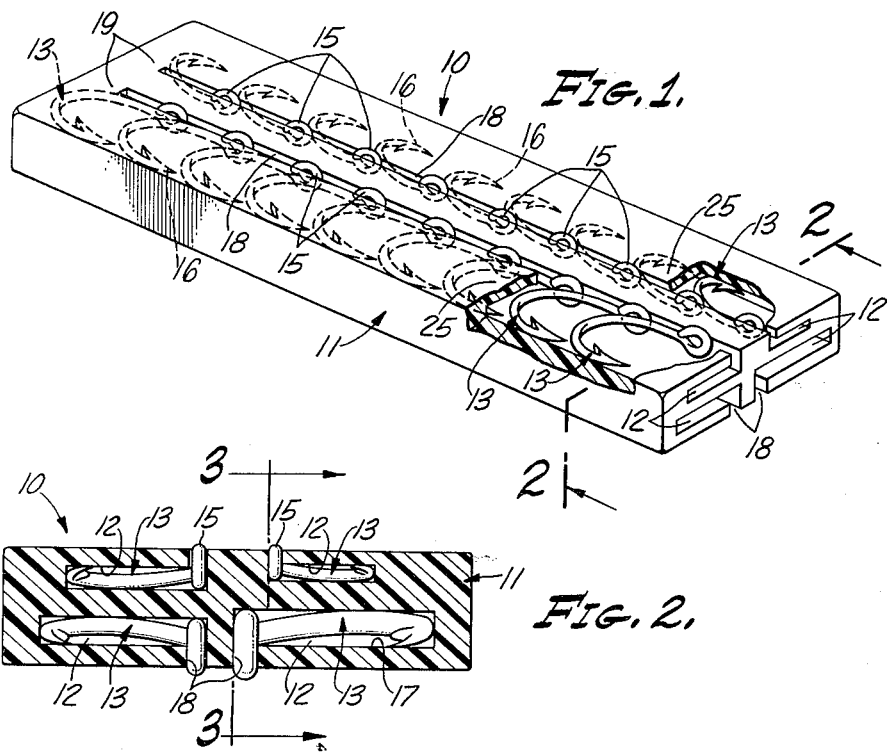
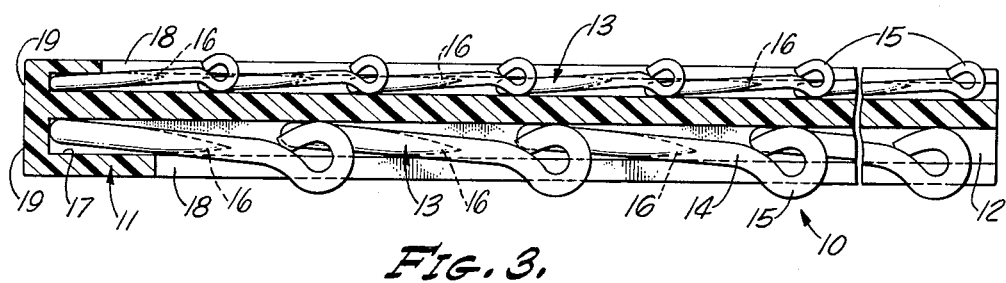
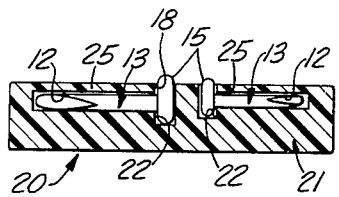
CHARLES R. McQUILLIN
ROBERT D. McDANNOLD
INVENTORS
BY
ATTORNEY United States Patent Office 3,206,068
Patented Sept. 14, 1965

3,206,068
FISH HOOK DISPENSER
Charles R. McQuillin, 1703 W. Palmyra Ave., Orange, Calif., and Robert D. McDannold, 1252B Franklin St., Santa Monica, Calif.
Filed Oct. 14, 1963, Ser. No. 315,806
3 Claims. (Cl. 221—307)

This invention relates to fish hook packaging means and particularly to a novel fish hook dispenser.

It is an object of the invention to provide a fish hook dispenser which is relatively small, which will have a capacity for storing a substantial number of fish hooks with the points of these hooks covered so as to prevent a person using the dispenser from inadvertently being caught on the barbs of the hooks, and which holds the hooks in such a manner that they may be readily manipulated one at a time to either introduce such a hook into the dispenser or to remove said hook therefrom.

Another object of the invention is to provide such a dispenser in which the eye of each hook projects from the dispenser a short distance to enable the hook to be slid lengthwise of the dispenser by engagement of the fingernail with said eye and whereby said hooks may be stored in said dispenser in columnized form.

Yet another object of the invention is to provide such dispenser in which a column of each of several different sizes of hooks may be introduced and stored to render any of said sizes of hooks conveniently accessible to the user of the dispenser and yet protect said user from the barbs of all of said hooks.

The manner of accomplishing the foregoing objects as well as further objects and advantages will be made apparent in the following description taken in connection with the accompanying drawings in which FIG. 1 is a perspective view of a preferred embodiment of the fish hook dispenser of the invention.

FIG. 2 is a cross sectional enlarged view taken on the line 2—2 of FIG. 1.

FIG. 3 is a longitudinal sectional view taken through the dispenser shown in FIGS. 1 and 2 along the line 3—3 in FIG. 2.

FIG. 4 is a cross sectional view of a somewhat simpler modified form of the dispenser of the present invention which is provided for confining and dispensing hooks of different sizes.

Referring specifically to the drawings, the preferred embodiment of the invention shown in FIGS. 1, 2 and 3 comprises a fish hook dispenser 10 which is preferably formed by injection molding of hard plastic in the form of a relatively flat long and narrow body comprising a block 11 having one or more L-shaped grooves 12 each of which lies parallel with and close to one of the major flat outer surfaces of the block 11 and extends parallel with said block longitudinally thereof. Each of the grooves 12 is made with a dimension to permit it to receive and store and dispense fish hooks 13 of a certain standard size in which said hooks are commonly manufactured. Each hook 13 no matter which size it may be made in, is formed of steel wire which provides a relatively straight stem or shank portion 14 on the upper end of which is formed by bending an eye 15 and from the lower portion of which a barbed hook portion 16 is bent. In each of the various sizes of hooks 13, the eye 15 always lies in the plane of the stem 14 of the hook, which plane is at right angles to the plane of the barbed portion 16 of the hook.

Each of the L-shaped grooves 12 of the fish hook dispenser 10 includes a relatively wide and flat chamber 17 which is dimensioned to receive the stem portion 14 and barbed portion 16 of the hooks which said groove is provided to receive with just enough tolerance in width so that the eye 15 of that hook may be received in a slot 18 which communicates with that groove 12 along one edge thereof from the adjacent surface of the block 11. The slot 18 is so dimensioned that the eyes 15 of the hooks 13 for which this particular groove 12 is dimensioned to receive will be caused to extend outwardly above the adjacent surface of the block 11 so that the eye 15 of each hook stored in said fish hook dispenser 10 may be pushed along the slot 18 of the groove in which said hooks are stored so as to fill each of the grooves 12 with a column of fish hooks 13 of the size that said groove is made to receive and dispense as shown in FIGS. 1 and 3.

One end of each of the grooves 12 is open as shown in FIG. 1 for receiving hooks 13 and for dispensing hooks therefrom while the opposite ends of said grooves are preferably blocked as by end walls 19 shown in FIG. 3 so that hooks 13 may be received at and dispensed from only one end of the block 11.

In the preferred form of the dispenser 10 shown in FIGS. 1, 2 and 3, grooves 12 and eye receiving slots 18 are provided with different dimensions to receive a column of each of four different sizes of fish hooks 13.

In the modified form 20 of the fish hook dispenser 10 shown in FIG. 4 the dispenser comprises a somewhat smaller block 21 which is provided with only two of the L-shaped grooves 12 and eye receiving slots 18 which are differently dimensioned for receiving and storing, in the modified form of dispenser 20, hooks 13 of two different sizes. The dispenser 20 also includes shallow grooves 22 which assist in guiding individual hooks along grooves 12.

The invention is made, either in its preferred or modified forms so that hooks 13 of different sizes may be received in their respective grooves 12 with a slightly snug fitting relationship between the hooks and the walls of the grooves 12 and slots 18 so that when hooks of different standard sizes corresponding in dimension to the dimensions of the respective grooves 12 and slots 18 of the dispenser have been introduced in columnized form into said grooves and slots, there will be a slight amount of friction longitudinally between the hooks and the walls of the respective grooves and slots confining the same which will prevent any of the hooks from accidentally escaping from their respective grooves 12 and slots 18.

It is to be noted that this result is attained by making each of the grooves 12 so close to the adjacent parallel outer surface of the block 11 that outer walls 25 are provided between said grooves and said outer block surfaces which walls are relatively thin and have a slight spring action for the purpose of applying a yieldable pressure against the hooks introduced into said grooves and preventing their accidental discharge therefrom.

While only a single preferred embodiment of the invention and one modified form of this have been disclosed in this application, it is to be understood that various changes and modifications may be made in these without departing from the spirit of the invention or the scope of the appended claims.

What is claimed is:

1. A dispenser for packaging a series of fish hooks of a certain simple type, the latter consisting of a steel wire which provides a relatively straight shank from one end of which a barbed hook portion is bent and from the other end of which an eye is bent, said barbed hook portion being offset from said shank in a given direction therefrom in a common plane with said shank, said eye being co-planar with and symmetrically formed on said shank and being disposed at right angles with said common plane, said dispenser comprising a flat body with a relatively flat upper surface, there being a relatively long flat hook storage chamber formed in said body parallel with and close to said upper surface said chamber being closed at one side thereof and opening upwardly through a narrow slot in said upper surface at the opposite side thereof, one end of said chamber and slot being open for the insertion of hooks into and their withdrawal from said chamber and slot, the depth and width of said chamber being dimensioned to slidably receive said shank and barbed hook portion lengthwise therein, with said shank disposed beneath said slot, said slot having a width to slidably receive said hook eye when aligned therewith, the depth of the bottom of said chamber at its slotted edge below said upper surface being less than the outside diameter of said hook eye whereby each of said hooks may be individually propelled longitudinally in said chamber by engagement with the upwardly protruding portion of the eye thereof, the offset relation of said chamber relative to said slot conforming to the offset relation of said barbed hook portion relative to said eye, whereby the longitudinally spaced relation of said barbed hook portion to said eye causes said eye to be maintained in alignment with said slot during movement of said hook lengthwise in said chamber.

2. A fish hook dispenser as recited in claim 1 wherein said chamber is placed so close to said longitudinal upper body surface that the material of said body forming the wall of said chamber between said chamber and said surface is thin enough to be relatively springy, and wherein the depth of said chamber is dimensioned to require said wall to be sprung slightly to allow said hooks to be received into said chamber, thereby yieldably retaining said hooks in said dispenser.

3. A fish hook dispenser as recited in claim 1 wherein there is also provided in said body in the bottom portion of said chamber which said slot overlies, a shallow groove which is in vertical alignment and coextensive with said slot so that said hook eye simultaneously slidably rides in said slot and said groove and the latter assists in guiding said eye in alignment with said slot.

References Cited by the Examiner

UNITED STATES PATENTS

| | | | |
|---|---|---|---|
| 2,281,208 | 4/42 | Schwarzkopf | 221—309 |
| 2,485,275 | 10/49 | Geller | 221—92 |
| 3,005,574 | 10/61 | Lovell | 221—310 |

FOREIGN PATENTS 659,849  10/51  Great Britain.

LOUIS J. DEMBO, *Primary Examiner.*

RAPHAEL M. LUPO, *Examiner.*